Nov. 24, 1931.  J. B. MACAULEY, JR  1,833,583

CARBURETOR

Filed May 31, 1928

INVENTOR
JOHN B. MACAULEY JR.
BY J. King Harness
ATTORNEY.

Patented Nov. 24, 1931

1,833,583

UNITED STATES PATENT OFFICE

JOHN B. MACAULEY, JR., OF DETROIT, MICHIGAN, ASSIGNOR TO CHRYSLER CORPORATION, OF DETROIT, MICHIGAN, A CORPORATION OF DELAWARE

CARBURETOR

Application filed May 31, 1928. Serial No. 281,615.

This invention relates to carburetors and more particularly to a filtering device embodied in the carburetor and forming a part of the fuel inlet passage.

An important object of the invention is to provide a filtering device forming a part of the carburetor which may be easily removed for cleaning without disturbing the connections from the fuel supply to the carburetor.

Another object of the invention is to provide a filter between the liquid supply passage leading to the carburetor beyond its connection to the carburetor and the inlet valve within the carburetor leading to the float chamber. A settling chamber is also provided below the screen and below the inlet opening leading to the carburetor.

Other objects and features of the invention including various desirable details of construction will be apparent from the following description of one illustrative embodiment shown in the accompanying drawings, in which.

Figure 1:
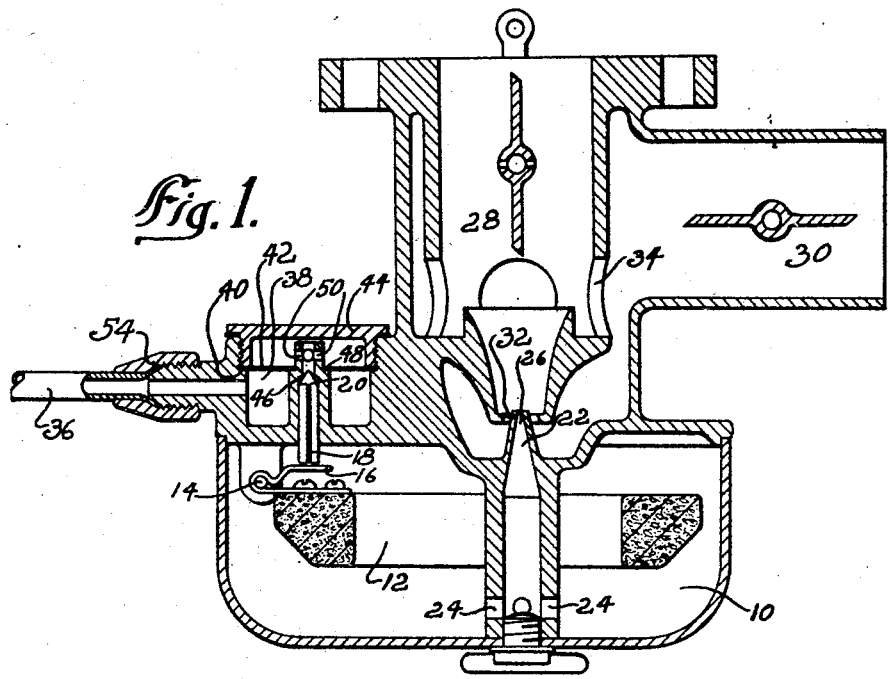
Fig. 1 is a sectional view of a carburetor showing one embodiment of my invention.
Figure 3:
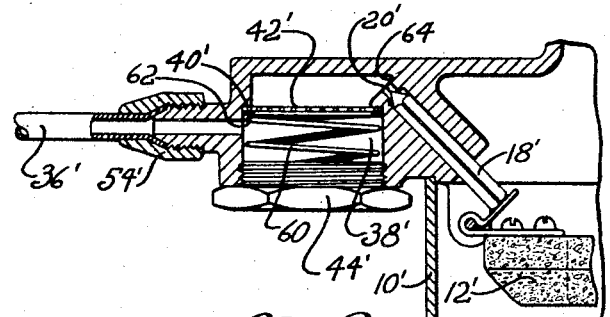
Fig. 3 is a fragmentary sectional view showing a modification of my improved device.
Figure 2:
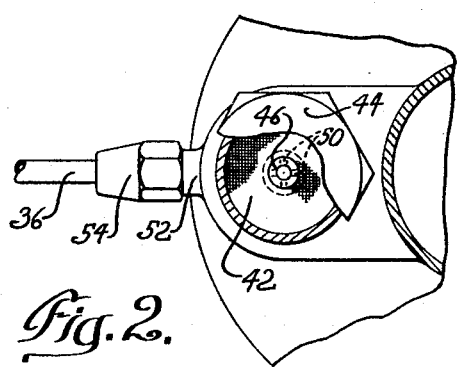
Fig. 2 is a plan view of a portion of the carburetor, parts being broken away and in section.

The carburetor illustrated is provided with a float chamber 10 within which is a float 12 pivoted as at 14 to the body of the carburetor. Movable with the float is a member 16 which engages a needle valve 18 in an opening 20. A nozzle 22 is adapted to receive liquid fuel through openings 24 and deliver the fuel through a restricted opening 26 into a mixing chamber 28. An air passage 30 is adapted to deliver air to the mixing chamber through an opening 32 adjacent the nozzle 22 and through openings 34.

The liquid fuel is admitted to the float chamber 10 from a supply line 36 leading into a well 38 formed in the body portion of the carburetor. The bottom of the well extends below the opening of the supply line 36 and above the opening of the supply line I have provided a shoulder 40 which receives a filtering member illustrated as a fine mesh screen 42. The inner periphery of the well 38, above the shoulder 40, is screwthreaded to receive a cap 44 which closes the upper open end of the well. A boss 46 is provided within the well, extending upwardly from the bottom thereof, and the filter 42 seats on a shoulder 48. The boss 46 is extended upwardly through the filter and is provided with openings 50 above the filter which communicates with the opening 20 regulated by the needle valve 18. The supply line 36 is connected to a screwthreaded boss 52 on the body of the carburetor by a flared tube coupling nut 54.

From the above it will be understood that the liquid from the supply line is received in the well 38 below the filter. The liquid then passes through the filter which removes all foreign particles. As the filter is arranged in a horizontal position the foreign particles fall to the bottom of the well away from the filter and below the inlet opening of the supply line. The filtered liquid above the filter passes through the openings 50 and the needle valve 18 is positioned by the float 12 regulating the amount of liquid supplied to the float chamber 10. If it is desired to replace the filter or clean the well or filter it is only necessary to remove the cap 44 and filter 42 without disturbing the connections to the carburetor.

In another form of my invention I have arranged the cap 44' on the underside of the carburetor forming the bottom of the well so that when the cap is removed the foreign particles are removed with the cap. In this form of my invention a well 38' is formed in the underside of the carburetor and is provided with a shoulder 40' adapted to receive a filter 42' in the form of a fine meshed screen. The outer open end of the well is screwthreaded to receive the cap 44' and a coil spring 60 between the filter and the upper surface of the cap holds the filter in position against the shoulder 40'.

It will be obvious that various changes including the size and arrangement of parts may be made without departing from the spirit of my invention and it is not my intention to limit its scope other than by the terms of the appended claims.

What I claim is:

1. In a carburetor, the combination of a float chamber, of a well adjacent said float chamber and having a passage communicating with said float chamber, a valve in the passage controlled by the liquid level in said float chamber, a free supply conduit adapted to deliver liquid into said well, a shoulder in the wall of said well between said fuel supply conduit and the passage between said well and said float chamber, and a filter device received by said shoulder, the open end of said well being screwthreaded to receive a cap.

2. In a carburetor, the combination with a float chamber, of a well adjacent said float chamber, an upwardly extending boss in said well having an opening forming a communication between the upper portion of said well and said float chamber, a fuel supply conduit in the wall of said well, and a filtering device extending transversely of said well between the wall of said well and the outer periphery of said boss and located between said fuel supply conduit and the opening forming a communication between the well and said float chamber.

JOHN B. MACAULEY, Jr.